United States Patent
Toyokura

[19]

[11] Patent Number: 5,970,209
[45] Date of Patent: Oct. 19, 1999

[54] ROASTING APPARATUS

[76] Inventor: Yasuhiro Toyokura, 8-20-47-A, Hisagi, Zushi-shi, Kanagawa, Japan

[21] Appl. No.: 09/223,576

[22] Filed: Dec. 30, 1998

[51] Int. Cl.[6] .................................. F24C 1/00; A23B 4/03
[52] U.S. Cl. .............................. 392/307; 219/400; 99/478
[58] Field of Search ............................ 392/307; 219/388, 219/400; 99/443 R, 443 C, 340

[56] References Cited

U.S. PATENT DOCUMENTS

| | | | |
|---|---|---|---|
| 4,096,792 | 6/1978 | Smith, Jr. | 99/355 |
| 4,246,836 | 1/1981 | Smith, Jr. | 99/478 |
| 4,369,585 | 1/1983 | Berkoff et al. | 34/63 |
| 4,860,461 | 8/1989 | Tamaki et al. | 34/68 |
| 4,871,901 | 10/1989 | Igusa et al. | 219/400 |
| 5,185,171 | 2/1993 | Bersten | 426/467 |
| 5,269,072 | 12/1993 | Waligorski | 34/594 |
| 5,394,623 | 3/1995 | Sewell | 34/544 |
| 5,855,164 | 1/1999 | Chiang | 99/340 |

FOREIGN PATENT DOCUMENTS

| | | |
|---|---|---|
| 59-30908 | 9/1985 | Japan . |
| 62-187323 | 2/1989 | Japan . |
| 62-194043 | 2/1989 | Japan . |
| 62-147886 | 3/1989 | Japan . |

*Primary Examiner*—Teresa Walberg
*Assistant Examiner*—Vinod D. Patel
*Attorney, Agent, or Firm*—Dougherty & Associates

[57] ABSTRACT

Disclosed is a roasting apparatus allowing automation of a roasting process including steps of charging a raw material, roasting it, and carrying a roasted product. A carrying-in port is opened in the bottom of a quantitative tank 1 for storing a raw material to be roasted, and a lid 34 is provided at an edge portion of the carrying-in port. A motor-driven cylinder 33 for opening/closing the lid 34 on the basis of an electric signal is provided to the lid 34. A roasting kiln 40 is disposed under the quantitative tank 1. An opening 63 is provided in the roasting kiln 40 and lids 42 are provided at edge portions of the opening 63. A kiln opening/closing link and a motor-driven cylinder 58 for opening/closing the lids 42 are provided outside the roasting kiln 40. A carrying passage 120 is provided under the roasting kiln 40. Burners 41 are disposed near the carrying passage 120 and electric heaters 71 are disposed around the rotational shaft 52. The outer surface of the electric heater 71 is covered with a far infrared radiation material. Slip rings 73 are provided around portions, positioned outside the roasting kiln, of the rotational shaft 52.

9 Claims, 12 Drawing Sheets

ROASTING APPARATUS

BACKGROUND OF THE INVENTION

The present invention relates to a roasting apparatus allowing automation of a roasting process including steps of charging a raw material to be roasted, roasting the raw material, and carrying out a roasted product.

A known roasting apparatus includes a roasting kiln formed into a circular shape or an elliptic shape in cross section.

<Drying/Roasting Step>

A circular roasting kiln in which rotary blades are mounted in the roasting kiln is known from Japanese Patent Publication Nos. Hei 4-17623 and Hei 5-5463. In this roasting kiln, the rotary blades are rotated upon roasting, to roast a material to be roasted.

Another circular roasting kiln in which a number of agitating blades spaced at specific intervals are projectingly formed on the inner peripheral wall surface of the roasting kiln is known from Japanese Utility Model Publication No. Hei 7-26951. In this roasting kiln, a material to be roasted, which is accumulated on the bottom of the roasting kiln, is scooped up by the agitating blades, and when the agitating blades reach the top of the roasting kiln, the material to be roasted is dropped.

An elliptic roasting kiln is known from Japanese Patent Publication No. Hei 3-56726, wherein a material to be roasted, which is accumulated on the bottom of the elliptic drum, is lifted upward and then dropped to sufficiently agitate the material to be roasted, thereby effecting uniform drying and roasting.

<Dipping Step>

A quantitative tank is used at the dipping step before roasting. At this dipping step, an operator has performed works of previously charging grain and water in the quantitative tank, dipping the grain in water in the quantitative tank, opening the bottom of the quantitative tank after the grain is sufficiently dipped in water, and charging the grain in a roasting kiln of the roasting apparatus.

However, the following problems are encountered in automating a roasting process including steps of dipping a raw material to be roasted in water and roasting the raw material to be roasted using the related art roasting apparatus.

<Dipping Step>

(1) The dipping step involves works of loosening a string having bound the end portion of a net bag, provided in the quantitative tank, for containing a raw material to be roasted, and charging the raw material to be roasted in a roasting kiln. The works are manually performed by an operator, thereby taking a lot of labor and processing time, and further, the works must be performed by an operator in such a severe working environment that the temperature in the work section is high by the thermal effect of the roasting kiln. For this reason, it may be desired to automate the dipping step.

(2) If the quantitative tank is disposed apart from the roasting kiln, since a raw material to be roasted, which has been dipped in water and taken out of the quantitative tank, must be immediately charged in an opening of the roasting kiln without being scattered to the outside, attention must be paid to arrangement and structures for mounting the quantitative tank and roasting kiln to each other and to the procedure of charging the raw material to be roasted in the roasting kiln.

(3) For a roasted product having a water content of 6%, the gelatinization degree of starch is about 30 to 40% which is low insufficient for the roasted product to be used as a drinkable health food or a drink. To improve the digestion characteristic of the roasted product, it is required to enhance the gelatinization degree of the roasted product. In particular, a roasted product of unpolished rice is indigestible, and therefore, it may be desired to enhance the gelatinization degree of the roasted product of unpolished rice.

<Drying/Roasting Step>

(4) In the case of roasting grain for a long time such as several hours until it is charred, it is difficult to uniformly heat the grain with strong fire. This is because strong fire burns only the surface of the grain and does not sufficiently heat up the interior of the grain. As a result, in the above case, the grain is required to be heated with weak fire or by controlling a fire power. To produce weak fire or control a fire power, however, the external gas heating is degraded in terms of safety, reliability and controllability.

(5) To take a roasted product out of a roasting kiln, there is adopted a method of rotating rotary blades or the rotary kiln in the direction opposed to that upon roasting by a motor and taking the product from a discharge port formed at one end of the roasting kiln. In this method, the use of a roasting kiln having a circular cross section presents a problem. That is to say, a raw material is only slipped on part of the inner peripheral surface of the circular roasting kiln, and thereby it is not agitated during take-out of the product. As a result, part of the raw material in contact with and in the vicinity of the inner wall of the roasting kiln is strong heated, while part of the raw material separated from the inner wall of the roasting kiln is not heated. In this way, it is difficult to uniformly roast the raw material.

The use of a roasting kiln having an elliptic cross section presents another problem. That is to say, the roasting kiln having an elliptic cross section can uniformly roast a raw material; however, it cannot be provided with rotary blades. In particular, since the temperature of the interior of the kiln is high, it is impossible to mount drive portions of a motor or hydraulic equipment. As a result, a roasted product is manually taken out by an operator, which takes a lot of time. Also since the rotation of the roasting kiln is stopped during take-out of the roasted product, the product accumulated in the roasting kiln is excessively heated, giving rise to inconveniences, such as occurrence of unevenness of roasting, obstruction to labor-saving, or an increase in processing time.

(6) In usual roasting for obtaining a product having a water content of about 3 to 14%, the roasting time is as relatively short as 20 to 45 minutes. In this case, according to the related art method, since the raw material is externally heated via a roasting kiln, the thermal conductance is poor. This makes longer the roasting time, to degrade the quality of a roasted product due to thermal deterioration of the product.

(7) At the roasting step, according to the related art method, there occurs a difference in uniformity between roasted products depending on a difference in the rotational speed of a roasting kiln, a difference in agitating state of a material to be roasted due to the charged amount in the kiln, and a difference in water content of the grain between the initial, medium and final stages at the roasting step. Further, the roasting time requires 30 minutes for each roasting, resulting in the reduced productivity. For this reason, it may be desired to improve the productivity without degradation of the quality.

(8) In the related art method, the termination of roasting is determined by setting the roasting time using a timer; however, the finishing water content of a roasted product is dependent on the atmospheric temperature and moisture, the dipping state of a raw material, or the initial state or the final state of the roasting operation continuously performed throughout one day, to thereby obstruct the uniformity of roasted products.

SUMMARY OF THE INVENTION

In view of the foregoing, the present invention has been made, and an object of the present invention is to provide a roasting apparatus which is capable of automating a roasting process including steps of dipping a raw material to be roasted in water, carrying the raw material in a roasting kiln, and taking a roasted product out of the roasting kiln, thereby improving a working environment in roasting operation; and reducing the thermal effect of the roasting kiln at the steps other than the roasting step by performing a sequence of the steps for a short period of time, thereby uniformly roasting the raw material and controlling the roasting operation depending on the kind or state of the raw material.

To achieve the above object, according to a first aspect of the present invention, there is provided a roasting apparatus including: a roasting kiln formed into a cylindrical shape having a non-circular cross section; a rotational shaft penetrating the center of the roasting kiln; an electric heater disposed at a portion, positioned in the roasting kiln, of the rotational shaft; and slip rings, disposed around the rotational shaft, for carrying a current to the electric heater.

With this roasting apparatus according to the first aspect of the present invention, since the electric heater is disposed in the roasting kiln and the slip rings for carrying a current to the electric heater are provided, the electric heater can be actuated via the slip rings to electrically heat the interior of the kiln, thereby performing the roasting operation with high thermal efficiency, and good safety, reliability and controllability as compared with gas heating. Accordingly, it is possible to roast grain with weak fire for a long period of time until it is charred.

According to a second aspect of the present invention, there is provided a roasting apparatus including: a roasting kiln formed into a cylindrical shape having a non-circular cross section; an opening, provided in the roasting kiln, for carrying a raw material to be roasted in the roasting kiln and carrying a roasted product out of the roasting kiln; a kiln lid provided at an edge portion of the opening; a kiln lid opening/closing mechanism, provided on an outer side surface of the roasting kiln, for opening/closing the kiln lid while being supported by the rotational shaft; a carrying passage, provided under the roasting kiln, for receiving the roasted product from the opening of the roasting kiln when the opening faces down; heating means for heating the roasting kiln, the means being composed of at least either burners disposed on at least one of both the sides of the carrying passage or an electric heater disposed at a portion, positioned inside the roasting kiln, of the rotational shaft; and slip rings disposed around portions, positioned outside the roasting kiln, of the rotational shaft, the slip rings being adapted to carry a current to actuating means for actuating the kiln lid opening/closing mechanism and to carry a current to the electric heater.

With this roasting apparatus according to the second aspect of the present invention, since the slip rings are provided for the actuating means for actuating the kiln lid opening/closing mechanism of the roasting kiln, when the opening of the roasting kiln faces down, a roasted product can be automatically discharged from the opening of the roasting kiln by actuating the kiln lid opening/closing mechanism.

In this roasting apparatus, since the roasting kiln is not only heated from outside by the burners but also it is heated from inside by the electric heater, the raw material can be uniformly heated and roasted for a short period of time, and also the heated quantity can be divided because of heating from inside and outside the roasting kiln, to thereby lower the heating temperature upon heating grain as the raw material. This is effective to reduce a loss in nutritional components of the grain. In addition, the heating only by the burners is equivalent to the usual external heating, and the heating only by the electric heater is equivalent to the internal heating described in the first aspect of the present invention.

An infrared heater or a far infrared heater may be used in place of the electric heater. In this case, the heat transfer due to convection is changed into the heat transfer due to radiation. The far infrared radiation energy is liable to be penetrated in a material to be heated. Accordingly, in the case of using the far infrared heater, grain is heated from inside, to enhance the thermal transfer effect, thereby heating and roasting the grain for a short period of time, and also the heating temperature of the grain is lowered, to further reduce a loss in the nutritional components of the grain.

Further, since the roasting kiln has an elliptic cross section, grain in the roasting kiln can be largely agitated by rotating the roasting kiln at a suitable rotational speed. That is to say, when an angular speed of the roasting kiln is low, the grain is moved in such a manner as to be slipped along the inner wall of the roasting kiln, and when the angular speed is excessively high, the grain is rotated while being positioned at a major axis portion of the elliptic kiln in cross section by the effect of a centrifugal force. Meanwhile, when the roasting kiln is rotated at a suitable angular speed, it is repeated that the raw material to be roasted, which is accumulated at the major axis portion, is moved upward and dropped, so that the raw material to be roasted in the roasting kiln is usually agitated. This is effective to uniformly perform the roasting operation.

According to a third aspect of the present invention, in addition to the configuration of the roasting apparatus described in the first or second aspect of the present invention, a quantitative tank, disposed over a region where the kiln lid provided at the edge portion of the opening of the roasting kiln is rotated, for storing a raw material to be roasted in a specific amount; a carrying-out port, disposed in the bottom of the quantitative tank, for carrying out the raw material to be roasted; a tank lid disposed at an edge portion of the carrying-out port; and a tank lid opening/closing mechanism, disposed to the lid, for opening/closing the tank lid on the basis of an electric signal.

With this roasting apparatus according to the third aspect of the present invention, since a raw material to be roasted can be charged from the quantitative tank into the roasting kiln, the carry-in and carry-out of the raw material to be roasted can be automated, to relieve the working environment and further make uniform the roasting operation.

According to a fourth aspect of the present invention, in addition to the configuration of the roasting apparatus described in the second aspect of the present invention, the roasting apparatus further includes a steam inlet pipe and a steam outlet pipe disposed in the quantitative tank.

With this roasting apparatus according to the fourth aspect of the present invention, since a raw material to be roasted in the quantitative tank is previously heated, it is possible to increase the water content of the raw material to be roasted and promote the equalization of the water content, and hence to obtain a roasted product with the increased gelatinization degree by uniform roasting operation.

According to a fifth aspect of the present invention, in addition to the configuration of the roasting apparatus described in any one of the first to fourth aspects of the present invention, the outer surface of the electric heater disposed in the roasting kiln is covered with a metal pipe, and the surface of the metal pipe is coated with a far infrared radiation material.

With this roasting apparatus according to the fifth aspect of the present invention, since the electric heater is covered with the metal pipe, it is possible to solve the problems that a raw material to be roasted is usually dropped from top to bottom in the roasting kiln to cause a possibility that the grain collides with the electric heater in the roasting kiln and damages the electric heater and that moisture of the raw material having been dipped in water in the quantitative tank is evaporated by heating to reduce the insulation of the electric heater.

According to a sixth aspect of the present invention, in addition to the configuration of the roasting apparatus described in any one of the first to fifth aspects of the present invention, a raw material to be roasted is processed by the steps of: feeding the raw material to be roasted in a specific amount in the quantitative tank; rotating the roasting kiln, stopping the rotation of the roasting kiln with the opening facing up, opening the kiln lid at the opening of the roasting kiln, and opening the tank lid at the bottom of the quantitative tank; charging the raw material to be roasted in the quantitative tank into the roasting kiln, closing the tank lid at the bottom of the quantitative tank, and closing the kiln lid at the opening of the roasting kiln; starting the rotation of the roasting kiln and the heating by the burners and/or the electric heater; detecting the temperature of the raw material to be roasted in the roasting kiln, and stopping the heating by the electric heater and/or the burners after the measured temperature of the raw material to be roasted reaches a specific value, and simultaneously stopping the rotation of the roasting kiln in such a manner that the opening of the roasting kiln faces to the carrying passage; opening the lid at the opening of the roasting kiln after the rotation of the roasting kiln is stopped with the opening facing to the carrying passage; and carrying a roasted product in the roasting kiln into the carrying passage.

With this roasting apparatus according to the sixth aspect of the present invention, it is possible to automate the carry-in and carry-out of a raw material to be roasted and hence to relieve the working environment and promote the automated operation.

According to a seventh aspect of the present invention, in addition to the configuration of the roasting apparatus described in any one of the first to sixth aspects of the present invention, the roasting apparatus further includes detecting means, disposed in the roasting kiln within a region in which the raw material to be roasted flows when the roasting kiln is rotated, for detecting the temperature of the raw material to be roasted; and slip rings for carrying a current to the detecting means, the slip rings being disposed around portions, positioned outside the roasting kiln, of the rotational shaft.

With this roasting apparatus according to the seventh aspect of the present invention, it is possible to electrically detect not the surface temperature but the internal temperature of a raw material to be roasted and hence to accurately control the roasting operation.

According to an eighth aspect of the present invention, in addition to the configuration of the roasting apparatus described in any one of the first to seventh aspects of the present invention, an electric motor for rotating the roasting kiln is connected to a program control mechanism for indicating a suitable rotational speed to the electric motor in such a manner that the raw material to be roasted is usually agitated along with control of the rotational speed of the rotational shaft of the roasting kiln and a change in water content.

With this roasting apparatus according to the eighth aspect of the present invention, since the finishing water content of a roasted product is determined on the basis of the temperature of a raw material to be roasted, it is possible to solve the problem in unevenness of products due to a difference in water content of the raw material between the initial stage and the final stage of roasting.

According to a ninth aspect of the present invention, in addition to the configuration of the roasting apparatus described in the eighth aspect of the present invention, the roasting apparatus further includes a sound sensor, provided on measuring means for measuring the rotational speed of the roasting kiln, for detecting the number of occurrence of sound generated by the raw material to be roasted which is moved in the roasting kiln upon rotation of the roasting kiln.

With this roasting apparatus according to the ninth aspect of the present invention, since the rotation of a raw material in the roasting kiln is synchronized with the rotation of the roasting kiln, it is possible to roast a raw material to be roasted depending on a change in water content between the initial, medium and final stage of the roasting operation, and hence to improve the uniformity of roasted products.

DETAILED DESCRIPTION OF THE PREFERRED EMBODIMENT

Figure 1:
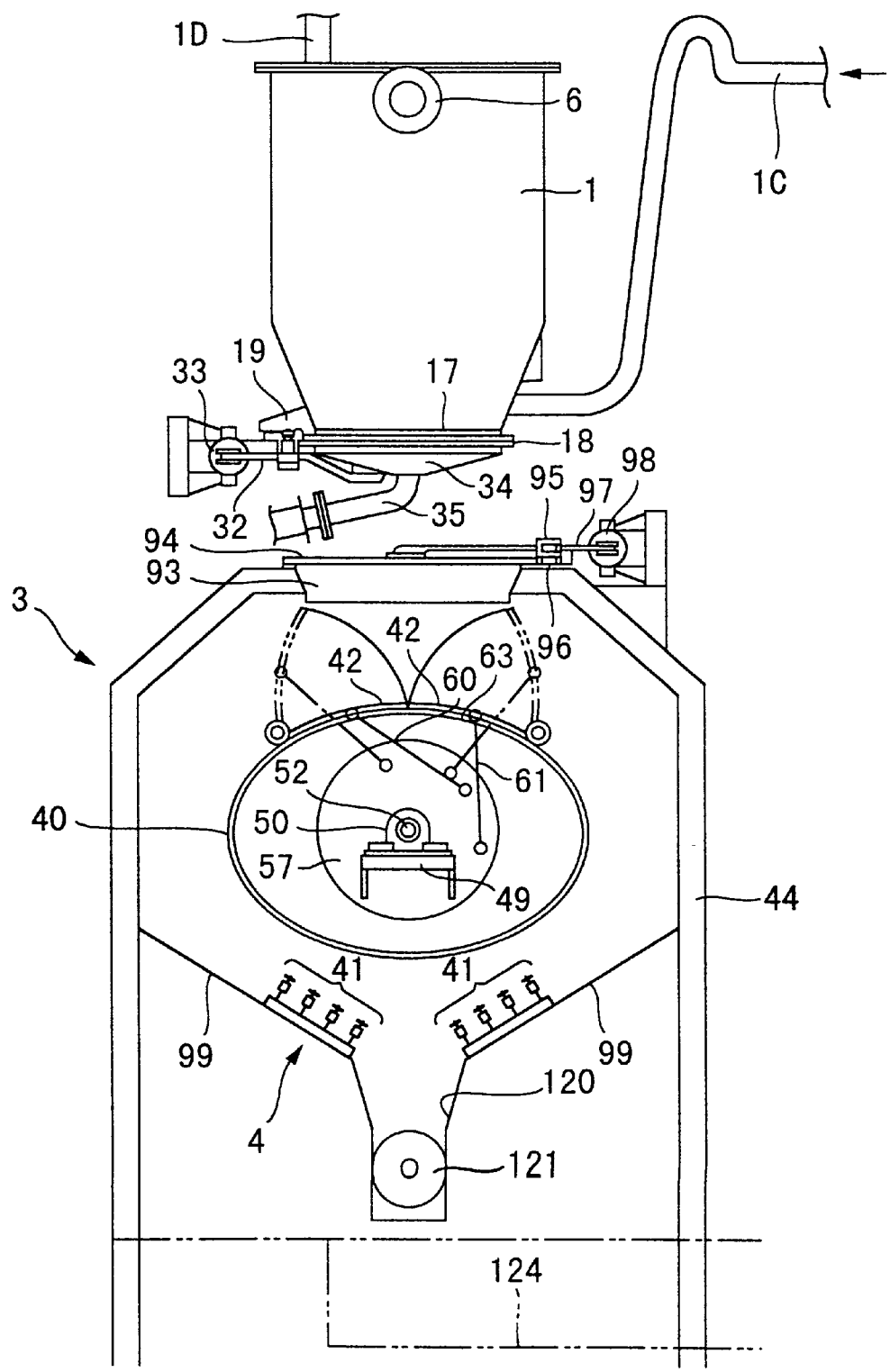
FIG. 1 is a schematic side view of a roasting apparatus according an embodiment of the present invention.
Figure 2:
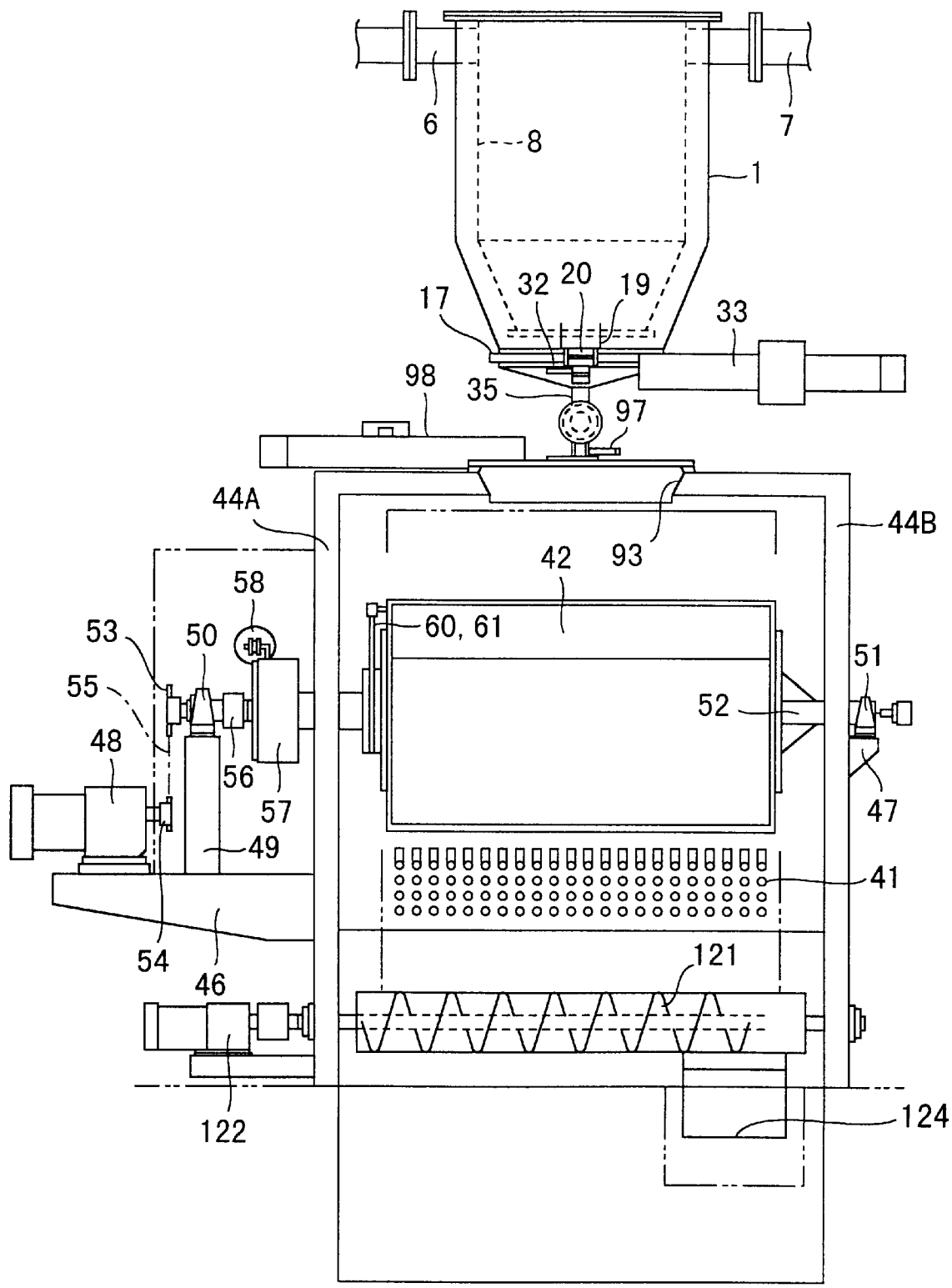
FIG. 2 is a schematic front view of the roasting apparatus shown in FIG. 1.

Hereinafter, a roasting apparatus according to a preferred embodiment of the present invention will be described with reference to the drawings.

The roasting apparatus in this embodiment includes a quantitative tank 1 for storing a raw material 2 to be roasted (for example, grain such as unpolished rice, wheat and beans, coffee beans, sesame seeds, tea leaves and plants), a roasting mechanism 3 for roasting the raw material 2 in the quantitative tank 1, a carrying-out mechanism 4 for carrying out a product having been roasted in the roasting mechanism 3, and a program controller 130 for controlling the quantitative tank 1 and the roasting mechanism 3.

Figure 3:
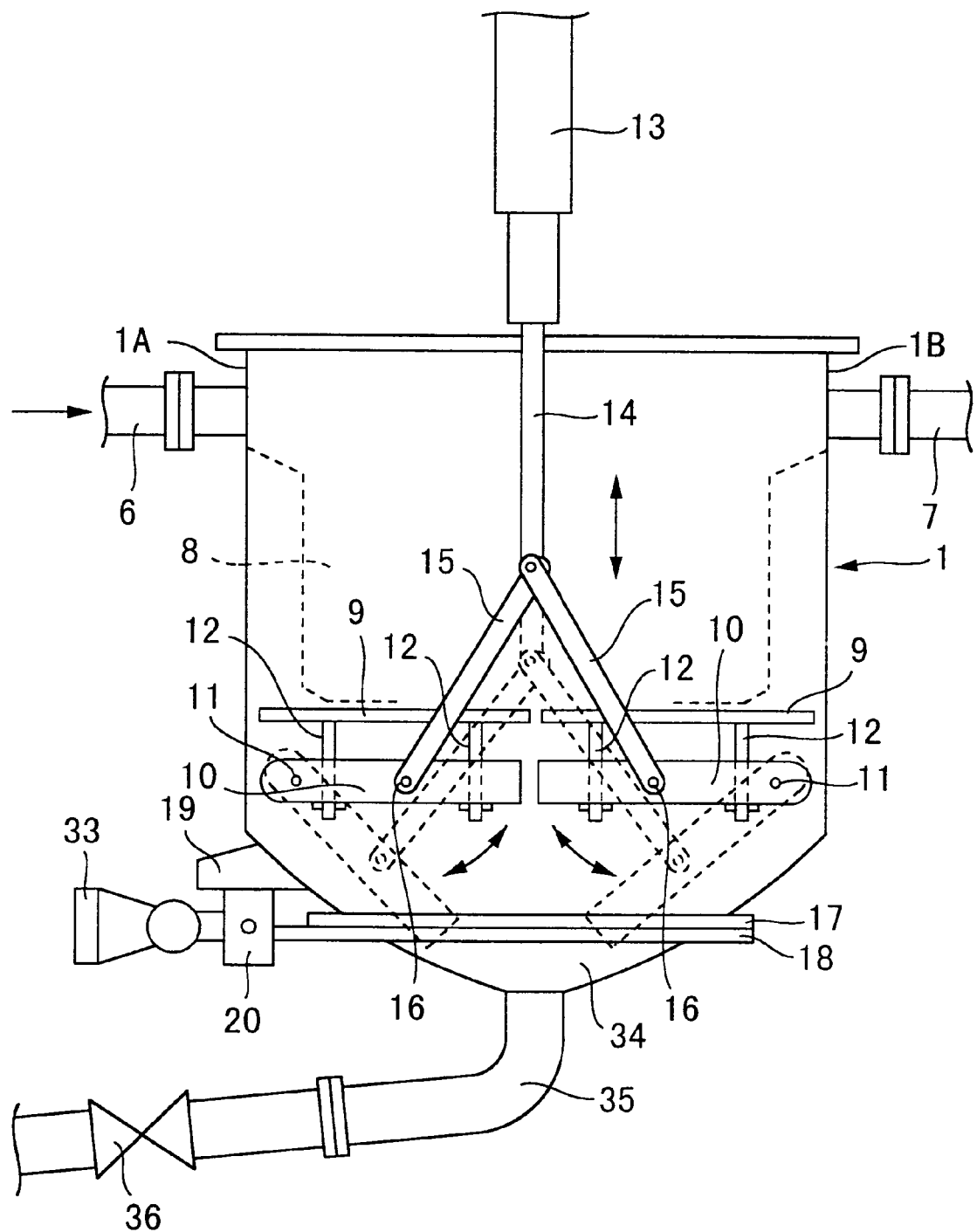
FIG. 3 is a schematic view of a quantitative tank shown in FIG. 1.
Figure 4:
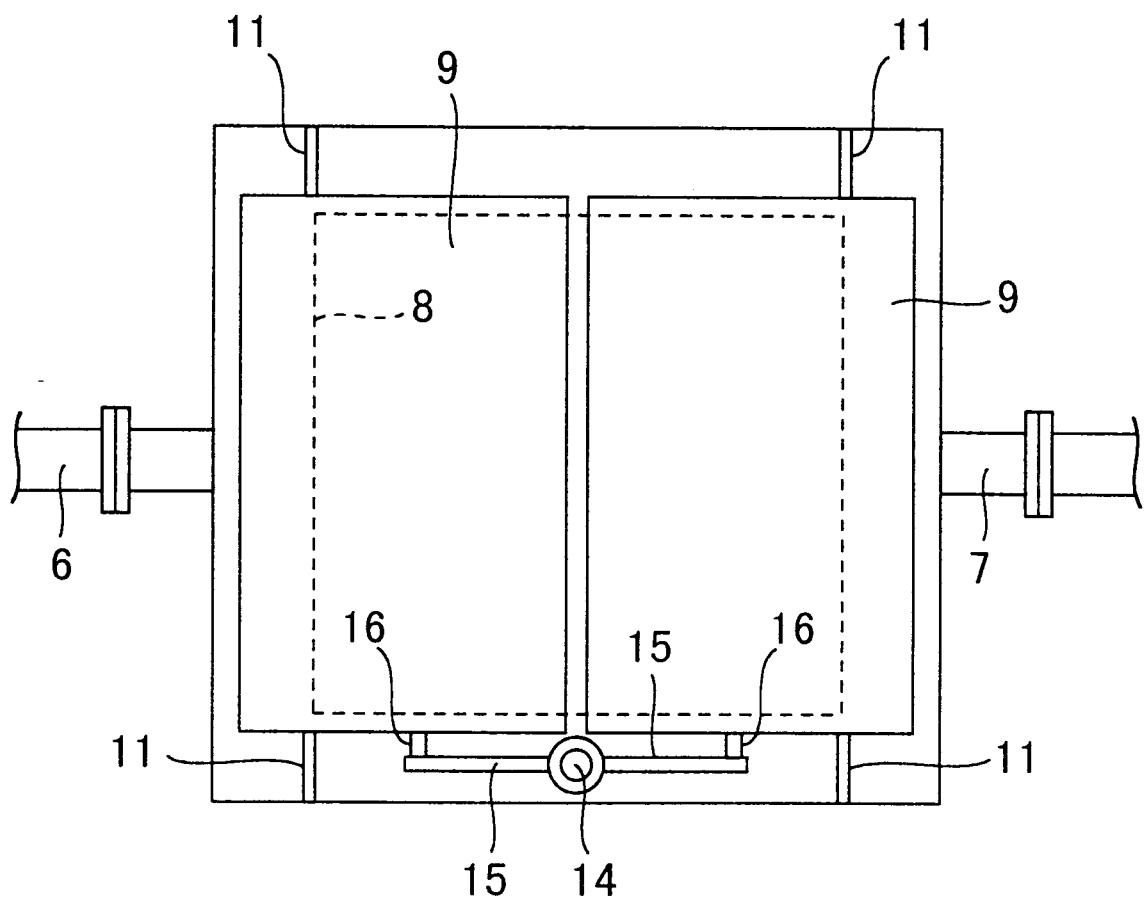
FIG. 4 is a schematic plan view of the quantitative tank shown in FIG. 3.

Referring to FIGS. 3 and 4, the quantitative tank 1, which is typically formed into a rectangular shape in a sectional plan view, has upper side wall portions 1A and 1B. A feed pipe 6 for feeding a raw material composed of water and grain and a discharge pipe 7 for discharging water are connected to the upper side wall portions 1A and 1B, respectively. While not shown, the raw material is fed from the feed pipe 6 by a pump and water is discharged from the discharge pipe 7 by a pump. Also, as shown in FIG. 1, a steam inlet pipe 1C and a steam outlet pipe 1D are connected to the quantitative tank 1 for heating water contained in the raw material with steam or warming the grain to be roasted with steam. The steam inlet pipe 1C has at a midpoint a portion higher than both the feed pipe 6 and the discharge pipe 7 for preventing water having been fed in the quantitative tank 1 from being discharged to the outside through the steam inlet pipe 1C.

The quantitative tank 1 contains a net bag 8 with its bottom portion opened, which net bag is disposed under the upper side wall portions 1A and 1B in such a manner as to be stretched along the inner wall of the quantitative tank 1. The net bag 8 has meshes which are small enough not to allow the grain of the raw material 2 to pass therethrough but to allow water in which the raw material 2 is dipped to pass therethrough. A pair of bottom plates 9 for supporting the bottom portion of the net bag 8 are disposed in the lower portion of the quantitative tank 1.

Rotational shafts 11, which are adapted to rotatably support supporting frames 10 of the pair of bottom plates 9, are respectively mounted on the inner lower portion of the quantitative tank 1. The bottom plate 9 is fixed via connecting rods 12 to the supporting frame 10 positioned under the bottom plate 9. Two links 15 are rotatably connected via two connecting pins 16 to the free end portions, positioned inside the quantitative tank 1, of the two supporting frames 10. The links 15 are connected to a cylinder rod 14 of an air cylinder 13.

The bottom portion of the quantitative tank 1 is formed in a truncated pyramid shape with its upper side widened and its lower side narrowed. A flange 17 is provided on an edge of an opening of the bottom portion of the quantitative tank 1 in such a manner as to project outward in the horizontal direction. A lid 18 is provided in such a manner as to be horizontally turnable and to be brought in contact with the flange 17. In a usual state, the lid 18 is in contact with the flange 17 to block the opening of the bottom portion of the quantitative tank 1.

Figure 5:
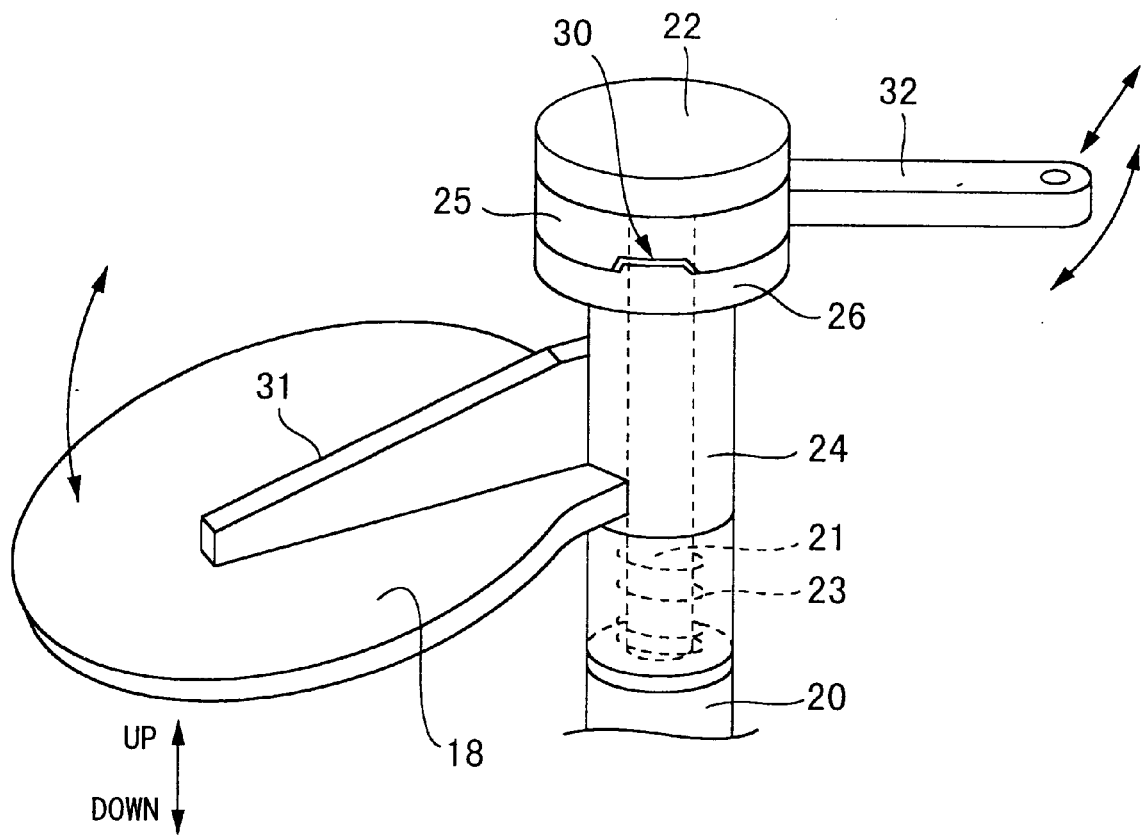
FIG. 5 is a schematic perspective view of a mechanism for opening/closing a lid of an opening portion provided at the bottom of the quantitative tank.

A bracket 19 is projectingly fixed on an outer peripheral wall of the lower portion of the quantitative tank 1, and a cylinder 20 is fixed on the bracket 19 in such a manner as to project downward therefrom. In addition, the cylinder 20 is enlargedly but vertically reversely shown in FIG. 5. A center shaft 21 is fixed to the central portion of the cylinder 20. A stopper flange 22 is mounted on the lower end (upper end in FIG. 5) of the center shaft 21. A coil spring 23 for exhibiting an elastically biasing force, a lid mounting portion 24 formed into a cylindrical shape, and a lever mounting portion 25 formed into a ring-shape are mounted around the center shaft 21. The coil spring 23 is interposed between the lower end of the cylinder 20 and the lid mounting portion 24. A ring-shaped flange 26, which meshes with the lever mounting portion 25, is formed at the lower end of the lid mounting portion 24. The lid mounting portion 24 and the lever mounting portion 25 are biased to the stopper flange 22 by the coil spring 23. The lever mounting portion 25 and the lid mounting portion 24 constitute cam mechanisms 30 shown in FIG. 6.

The cam mechanism 30 is composed of an engagement hole 26' and a tilting plane 27 formed on the lid mounting portion 24 side, and an engagement projection 28 and a tilting projection 29 formed on the lever mounting portion 25. A pair of these cam mechanisms 30 are formed between the lever mounting portion 25 and the lid mounting portion 24 at symmetrical positions in the peripheral direction thereof.

Figure 6:
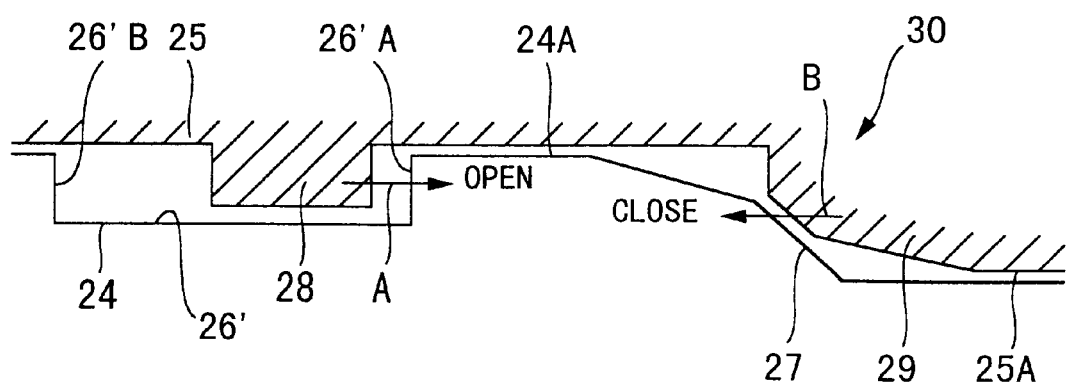
FIG. 6 is a view showing a cam shape of the mechanism shown in FIG. 5.

When the lever mounting portion 25 is moved in the direction shown by the arrow A in FIG. 6, the engagement projection 28 is brought in contact with a wall surface 26'A of the engagement hole 26' to turn the lid mounting portion 24 in the direction shown by the arrow A. This causes the lid 18 mounted on the lid mounting portion 24 to be turned in the direction shown by the arrow A and hence to open the opening of the bottom portion of the quantitative tank 1.

When the lever mounting portion 25 is moved in the direction shown by the arrow B in FIG. 6, the tilting projection 29 is brought in contact with the tilting plane 27 to turn the lid 18 in the direction where the lid 18 closes the opening of the bottom portion of the quantitative tank 1. Then, when the lid 18 is brought in contact with a stopper (not shown) provided on the flange 17 for setting the closing position of the lid 18, the tilting projection 29 goes on the tilting plane 27 and a lower surface 25A of the lever mounting portion 25 goes on an upper surface 24A of the lid mounting portion 24. As a result, the coil spring 23 is compressed, causing the lid 18 to tightly close the opening of the bottom portion of the quantitative tank 1. In addition, the projecting height of the engagement projection 28 is set to be lower than the projecting height of the tilting projection 29, so that the engagement projection 28 is kept at a position higher than that of the opening of the engagement hole 26' on the way the tilting projection 29 goes on the tilting plane 27. Also when the tilting projection 29 is brought in contact with the tilting plane 27 and thereby the lid 18 is started to close the opening of the bottom portion of the quantitative tank 1, the engagement projection 28 is not brought in contact with a vertical wall surface 26'B of the engagement hole 26' and is allowed to be smoothly moved leftward in FIG. 6.

A bracket 31 for supporting the backface of the lid 18 is fixedly welded to both the lid mounting portion 24 and the lid 18.

A lever 32 for opening/closing the lid 18 is projectingly provided on the lever mounting portion 25, and a cylinder rod (not shown) of a motor-driven cylinder 33 is connected to the leading end of the lever 32. The motor-driven cylinder 33 is fixed on a frame of the roasting apparatus.

A conical bottom portion 34 is integrated with the backface of the lid 18. The movement of the lid 18 integrated with the conical bottom portion 34 to open the opening of the bottom portion of the quantitative tank 1 allows the raw material 2 in the quantitative tank 1 to be dropped. A drain pipe 35 for discharging water in which the raw material 2 has been dipped in the quantitative tank 1 is connected to the conical bottom portion 34, and a valve 36 for adjusting the amount of water content in the quantitative tank 1 is provided at a midpoint of the drain pipe 35. In order to allow the drain pipe 35 to be turned integrally with the conical bottom portion 34, the end portion, opposite to the conical bottom portion 34, of the drain pipe 35 is flexibly connected to a pipe fixed on a wall surface or the like via an elastically deformable tube made from a flexible rubber or plastic.

[Roasting Mechanism]

The roasting mechanism 3 is basically composed of a roasting kiln 40, burners 41, electric heaters 71 disposed in the roasting kiln 40, and an opening/closing mechanism 43 for opening/closing two lids 42 of the roasting kiln 40.

A case 44 for housing the roasting kiln 40 and burners 41 is formed into a box-like shape. Brackets 46 and 47 are mounted on the outer surfaces of a pair of side walls 44A and 44B of the exterior case 44, respectively. A motor 48 and a bearing base 49 are mounted on the bracket 46 projecting from the side wall 44A, and a bearing 50 is fixed on the bearing base 49. A bearing 51 is fixed on the bracket 47 projecting from the side wall 44B. A rotational shaft 52 is rotatably mounted on the bearings 50 and 51 in such a manner as to pass through the roasting kiln 40. A sprocket 53 is fixed on an end portion, on the bearing 50 side, of the rotational shaft 52, and is connected via a chain 55 to a sprocket 54 provided around an output shaft of an electric motor 48.

Figure 7:
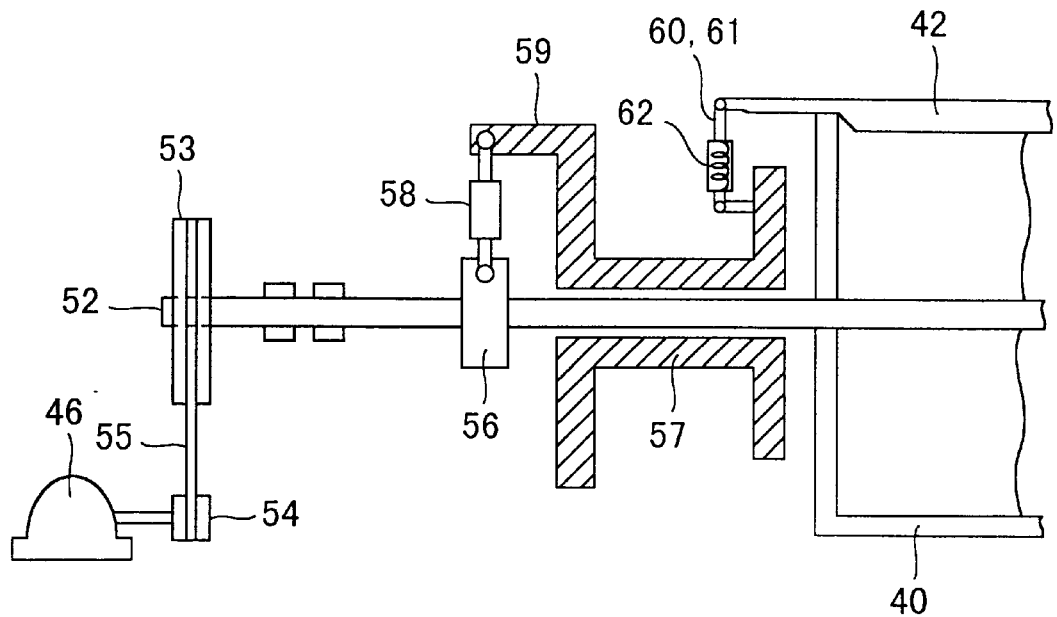
FIG. 7 is a typical view showing a mounting state of a motor-driven cylinder for opening/closing lids of a roasting kiln.
Figure 8:
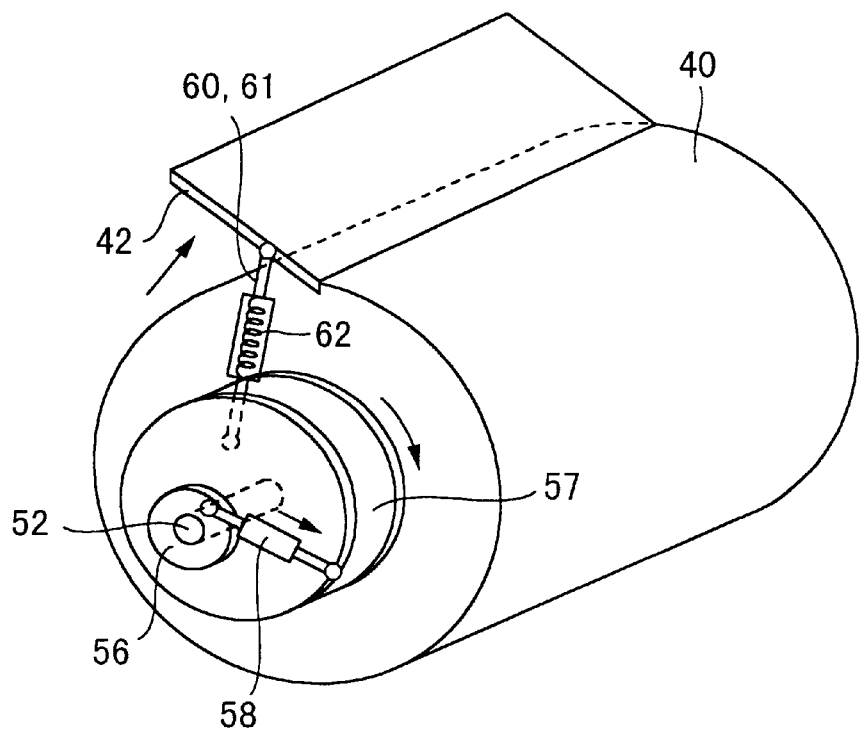
FIG. 8 is a typical view showing a state in which the motor-driven cylinder shown in FIG. 7 is mounted to the roasting kiln.

As shown in FIG. 7, a fixed ring 56 and a kiln opening/closing ring 57 are provided at respective portions, on the bearing 50 side, of the rotational shaft 52. The fixed ring 56 is fixed integrally with the rotational shaft 52. As shown in FIGS. 7 and 8, one end of a motor-driven cylinder 58 is connected to the peripheral surface of the fixed ring 56 and the other end of the motor-driven cylinder 58 is connected to a connecting projection 59 of the kiln opening/closing ring 57. While the kiln opening/closing ring 57 itself is provided rotatably with respect to the rotational shaft 52, the kiln opening/closing ring 57 can be rotated with the rotational shaft 52 because it is connected to the motor-driven cylinder 58. The kiln opening/closing ring 57 is relatively turned with respect to the rotational shaft 52 by expansion/contraction of the motor-driven cylinder 58.

The kiln opening/closing ring 57 is adapted to open/close each of the two lids 42 of the roasting kiln 40 mounted on the rotational shaft 52. As shown in FIG. 7, the kiln opening/closing ring 57 is connected to the lid 42 via each of kiln opening/closing links 60 and 61. Each of the kiln opening/closing links 60 and 61 is provided with a spring 62 for finely adjusting the opening/closing of the lid 42.

The roasting kiln 40 is formed into a cylindrical shape having an elliptic cross-section taken along a plane crossing the rotational shaft 52 at right angles, and has an opening 63 through which the raw material 2 is to be carried from the quantitative tank 1. The lids 42 are rotatably supported via hinges on the edge of the opening 63. The lids 42 are biased in the direction of closing the opening 63 by means of the kiln opening/closing links 60 and 61, respectively.

Figure 9:
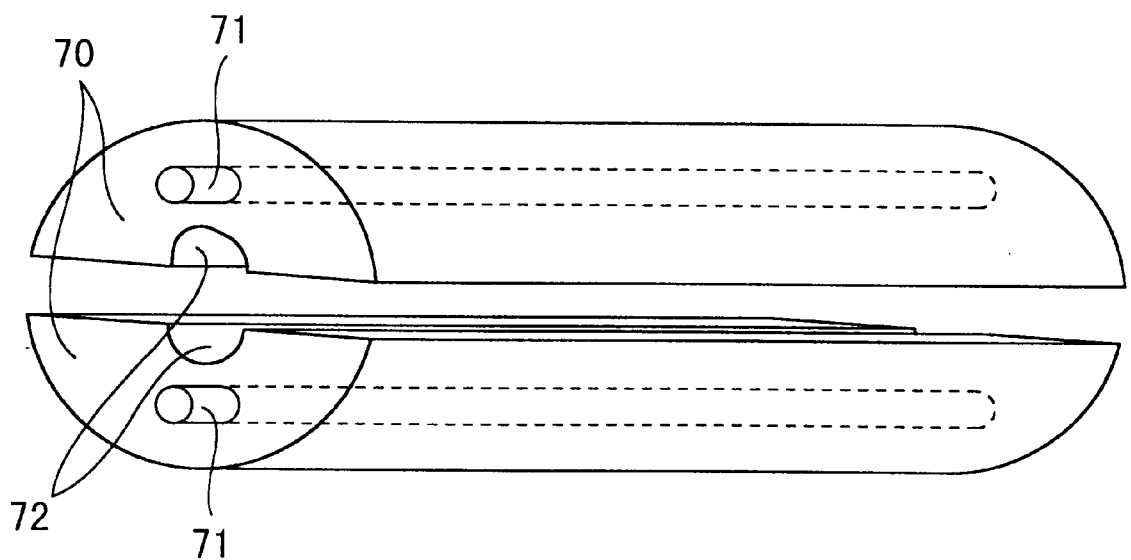
FIG. 9 is a typical perspective view of electric heaters shown in FIG. 1.
Figure 10:
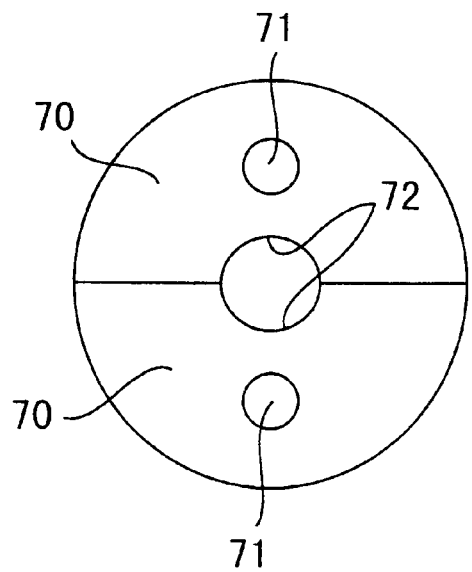
FIG. 10 is a typical side view of the electric heaters shown in FIG. 9.

As shown in FIGS. 9 and 10, a pair of heat radiation cases (metal pipes) 70, each of which is formed of a semi-elliptic cylinder, are mounted around a portion, positioned inside the roasting kiln 40, of the rotational shaft 52. The outer peripheral surface of the heat radiation case 70 is coated with a layer of a far infrared radiation material (for example, a ceramic material such as alumina) by thermal spraying. An electric heater 71, typically a quartz heater, is disposed in the heat radiation case 70. A semicircular recess 72 to be fixed around the rotational shaft 52 is formed at the central portion of the heat radiation case 70. The pair of heat radiation cases 70 are assembled into an elliptical shape and are fixed around the rotational shaft 52.

Figure 11:
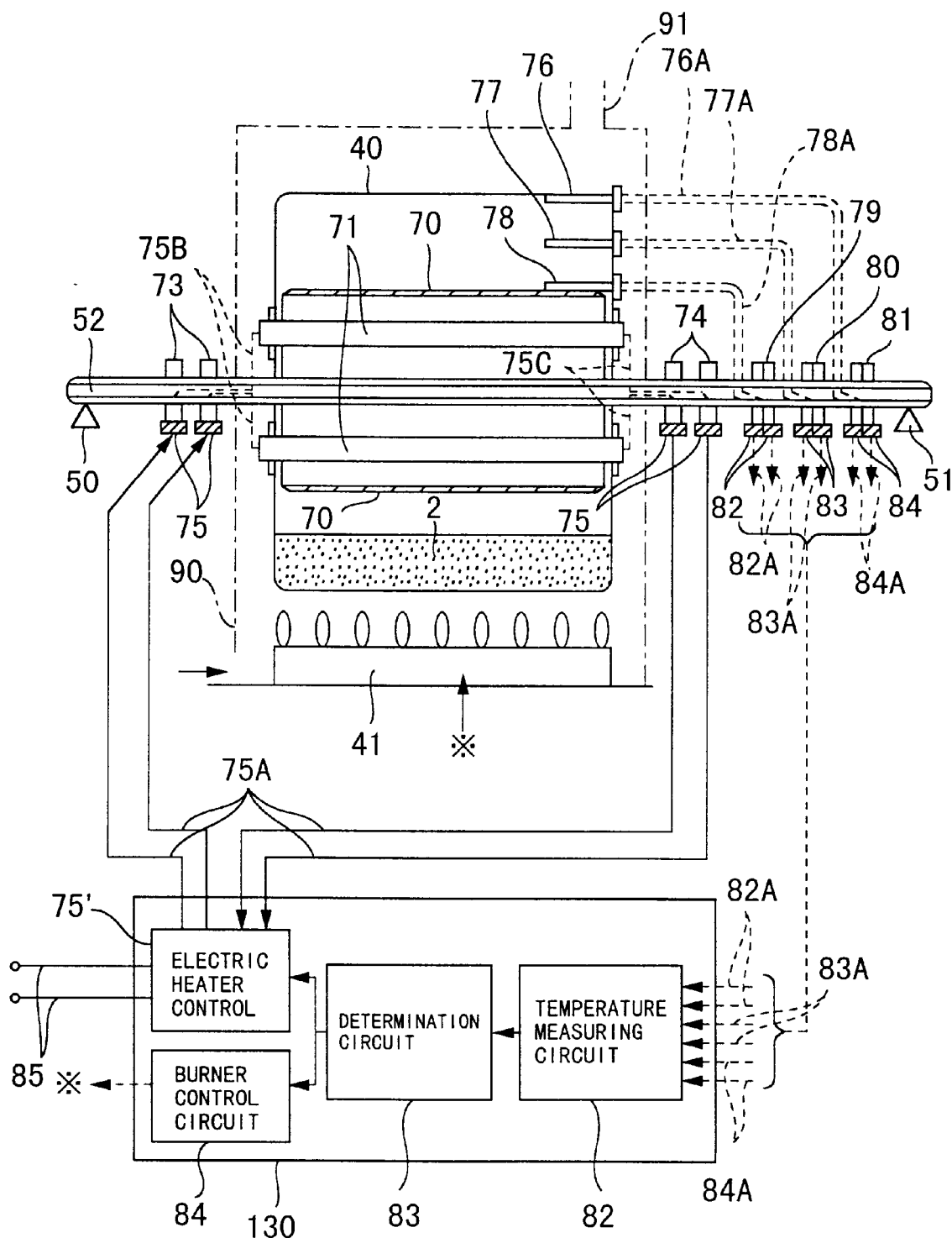
FIG. 11 is a schematic diagram showing temperature sensors for the roasting kiln shown in FIG. 1 and a control system.

As shown in FIG. 11, slip rings 73 and 74 for feeding electric power to the pair of electric heaters 71 are mounted around respective portions, outside the case 44 and near the bearings 50 and 51, of the rotational shaft 52. The slip rings 73 and 74 are connected to an electric heater control circuit 75' via contacts 75 and lead wires 75A. Lead wires 75B and 75C for respective connection between the slip rings 73 and the electric heaters 71 and between the slip rings 74 and the electric heaters 71 are provided in the rotational shaft 52.

A temperature sensor 76 for measuring the temperature of the inner wall of the roasting kiln 40 is provided in contact with the inner wall of the roasting kiln 40. A temperature sensor 77 for measuring the temperature of the raw material 2 is provided in a region of the roasting kiln 40 in which the raw material 2 flows. A temperature sensor 78 for measuring the temperature of the assembled heat radiation cases 70 is provided in contact with the peripheral surface of the assembled heat radiation cases 70.

Slip rings 79 to 81 are mounted on portions, outside the side wall portion 44B and on the bearing 51 side, of the rotational shaft 52. The slip rings 79 to 81 are connected to the temperature sensors 78 to 76 via lead wires 78A to 76A and connected to a temperature measuring circuit 82 via contacts 82 to 84 and lead wires 82A to 84A, respectively.

The temperature measuring circuit 82 is connected to a determination circuit 83 which is in turn connected to both the electric heater control circuit 75' and a burner control circuit 84. The temperature measuring circuit 82 is adapted to feed a current at a specific voltage to the temperature sensors 76 to 78, to receive temperatures detected by the temperature sensors 76 to 78 on the basis of change in current or drop in voltage, and to output the temperatures to the determination circuit 83.

The determination circuit 83 can changeably set target temperatures required to obtain a calorie necessary for the raw material 2 to be converted into a roasted product having a specific water content and specific gelatinization degree. To be more specific, the determination circuit 83 can set the target temperature of the raw material 2, the target temperature of the outer wall of the roasting kiln 40 and the target temperature of the assembled heat radiation cases 70.

The determination circuit 83 compares the output obtained from the temperature sensor 78 via the temperature measuring circuit 82 with the target temperature of the electric heaters 71. If the output is higher than the target temperature, the determination circuit 83 outputs a control signal for stopping the feeding of the power to the electric heaters 71 to the electric heater control circuit 75'. The electric heater control circuit 75' interrupts the feeding of the power from a power feed line 85 on the basis of the control signal supplied from the determination circuit 83.

The determination circuit 83 also receives the temperature measured by the temperature sensor 77 via the temperature measuring circuit 82. If the measured temperature of the raw material 2 is lower than the target temperature of the raw material 2, the determination circuit 83 supplies a control signal for feeding a power to the electric heaters 71 to the electric heater control circuit 75'. In addition, if the temperature of the raw material 2 measured by the temperature sensor 77 is lower than the target temperature of the raw material 2 and the temperature of the assembled heat radiation cases 70 measured by the temperature sensor 78 is higher than the target temperature of the assembled heat radiation cases 70, the determination circuit 83 assigns a high priority to the temperature of the raw material 2 and supplies a control signal for feeding a power to the electric heaters 71 to the electric heater control circuit 75'.

The determination circuit 83 also receives the temperature of the outer peripheral surface of the roasting kiln 40 from the temperature sensor 76 via the temperature measuring circuit 82. If the measured temperature of the outer peripheral surface of the roasting kiln 40 is lower than the target temperature of the roasting kiln 40, the determination circuit 83 supplies a control signal for allowing burning by the burners 41 to the burner control circuit 84. If the burners 41 are not ignited, the gas is fed to the burners 41 after the burners 41 are ignited by actuating an igniter, and if the burners 41 are already ignited, the gas is of course immediately fed to the burners 41. If the measured temperature of the roasting kiln 40 is higher than the target temperature of the roasting kiln 40, the determination circuit 83 supplies a control signal for stopping the feeding of the gas to the burners 41 to the burner control circuit 84.

An air inlet 90 is formed in the lower portion of the case 44 and an air outlet 91 is formed in the upper portion of the case 44. A material charging port 93, through which the raw material 2 is to be charged, is provided in the upper portion of the case 44 at a position under the opening formed at the bottom of the quantitative tank 1. A lid 94 is horizontally rotatably mounted to the material charging port 93. A fixed shaft 95 is projectingly formed on an edge portion of the material charging port 93 of the case 44, and a cylinder 96 is turnably inserted around the fixed shaft 95. The lid 94 and a horizontally projecting lever 97 are integrally welded to the cylinder 96. A cylinder rod of a motor-driven cylinder 98 is connected to the lever 97, wherein the lid 94 is opened/closed by forward/backward movement of the cylinder rod of the motor-driven cylinder 98.

A pair of tilting planes 99 are formed on the inner lower side of the case 44, and a large number of the burners 41 are provided on the tilting planes 99. The burner 41 is typically of a type of burning LP gas but may be of a type burning town gas.

Figure 12:
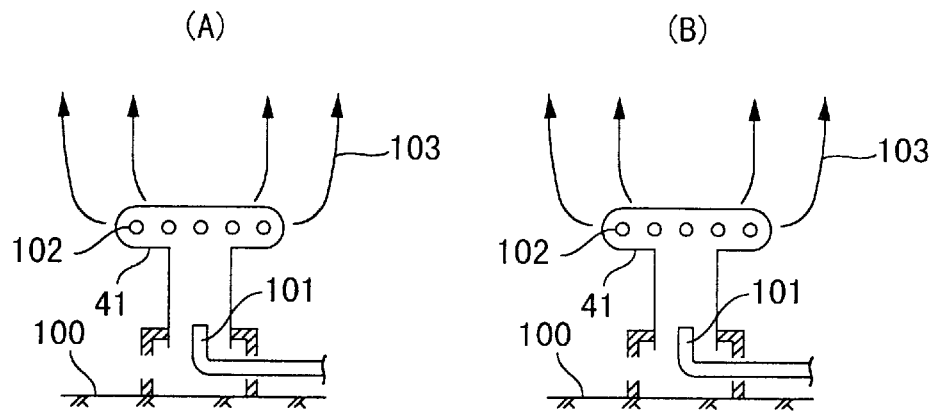
FIGS. 12A and 12B are schematic diagrams each showing the direction of flame depending on the orientation of a nozzle of a gas burner.

As shown in FIGS. 12A and 12B, in the case where the burner 41 is perpendicularly attached on a horizontal wall surface 100, when gas jetting from a gas blowout nozzle 101 of the burner 41 fires, a flame 103 extends upward from a gas blowout hole 102.

Figure 13:
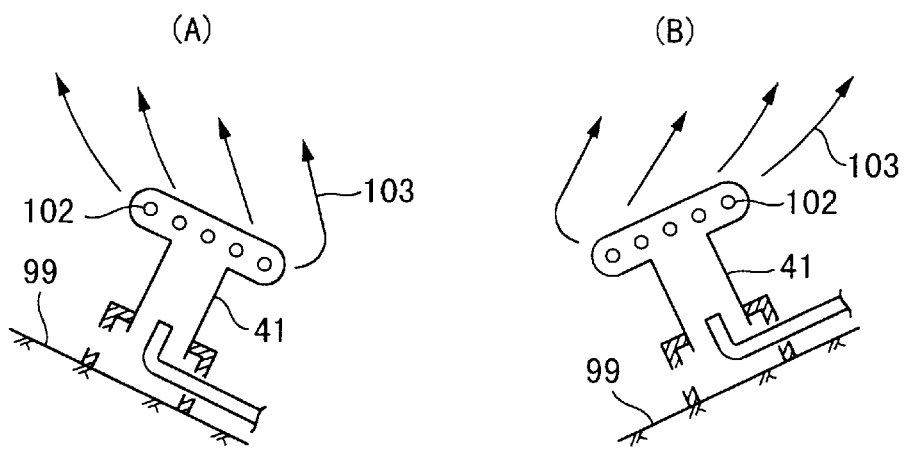
FIGS. 13A and 13B are schematic diagrams each showing the direction of flame depending on the orientation of a nozzle of a gas burner.

As shown in FIGS. 13A and 13B, in the case where two pieces of the burners 41 are perpendicularly attached on the tilting wall surfaces 99 tilted opposite to each other respectively, flames 103 extending from both the burners 41 are easy to spread outward, so that the heat of the flames 103 are easy to be transmitted over the lower portion of the roasting kiln 40.

Figure 14:
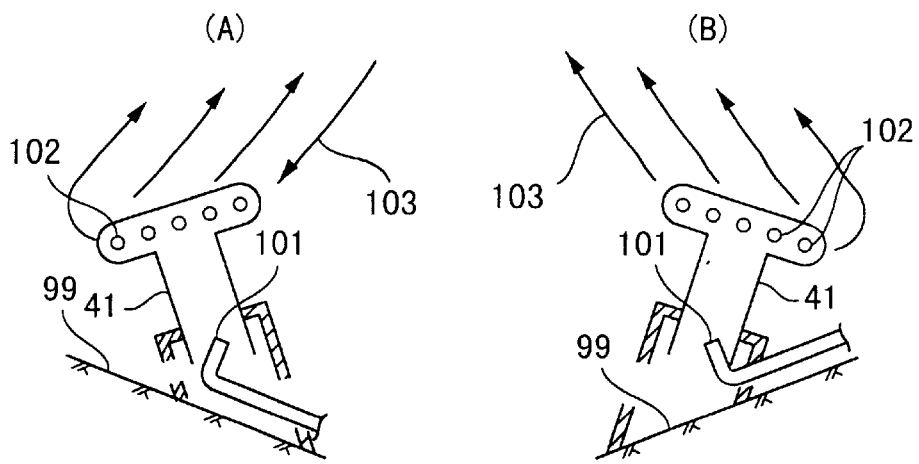
FIGS. 14A and 14B are schematic diagrams each showing the direction of flame depending on the orientation of a nozzle of a gas burner.

As shown in FIGS. 14A and 14B, in the case where the burner 41 is attached on each of the two tilting wall surfaces 99 in such a manner as to be tilted slightly outward therefrom, flames 103 extending from both the burners 41 are easy to be collected to the central portion of the roasting kiln 40. This arrangement of the burners 41 is effective to enhance the burning efficiency.

Figure 15:
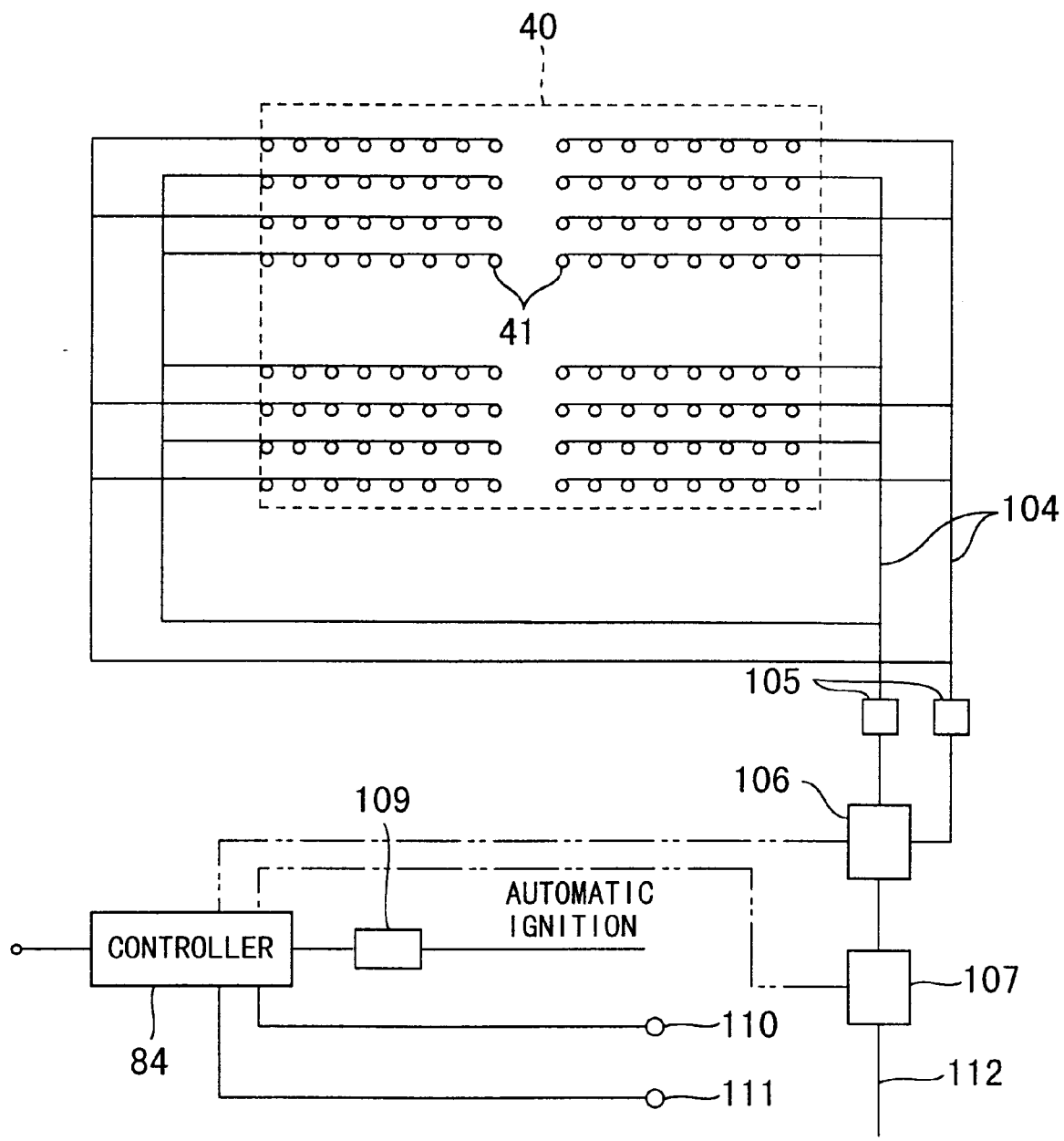
FIG. 15 is a block diagram of a gas feeding route to burners and a control circuit.
Figure 16:
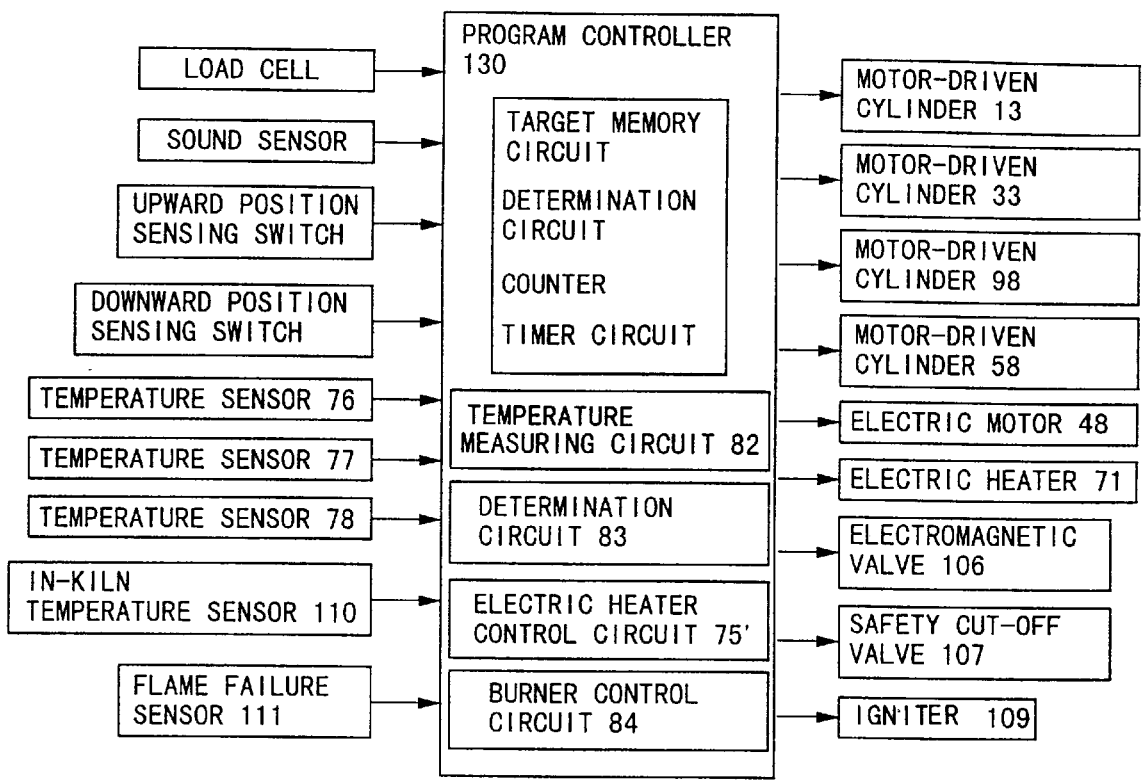
FIG. 16 is a block diagram showing a state in which components of the roasting apparatus in this embodiment are connected to a program controller for controlling the roasting apparatus.
Figure 17:
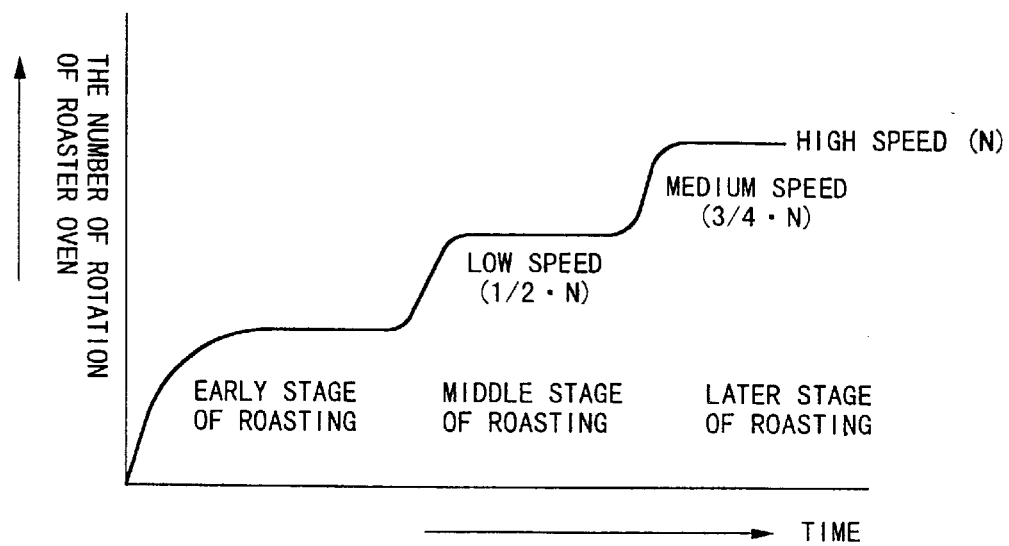
FIG. 17 is a graph showing a low speed rotational mode, medium speed rotational mode, and high speed rotational mode of the roasting kiln.

FIG. 15 is a schematic view showing a gas feeding route to the burners 41. Two gas pipes 104 are connected to the right and left tilting wall surfaces 99 shown in FIG. 1, respectively. The right and left gas pipes 104 are respectively connected to manually adjusting valves 105 for manually adjusting the fed amount of gas. The manually adjusting valves 15 are connected to a switching solenoid valve 106 for electrically switching strong fire and weak fire to each other, which switching solenoid valve is in turn connected to a safety cutoff valve 107 provided for ensuring safety. The safety cutoff valve 107 is connected to an LP gas pipe 112. The switching solenoid valve 106 is electrically controlled by the burning control circuit 84 shown in FIG. 11. The burning control circuit 84 is connected to an igniter 109 for igniting the burners 41, an in-kiln temperature sensor 110 and a flame failure temperature sensor 111.

The in-kiln temperature sensor 110 provided in the case 44 detects whether the temperature of the interior of the case 44 is in a low temperature region insufficient for roasting or in a suitable temperature region sufficient for roasting. If the measured temperature of the interior of the case 44 is in the insufficiently low temperature region, the switching solenoid valve 106 is switched on the side in which the fed amount of gas is maximized. If it is in the suitable temperature region, the switching solenoid valve 106 is switched on the side in which the fed amount of gas is minimized. In addition, if it is in an abnormally high temperature region, the safety cutoff valve 107 is turned off to cut off the feeding of gas.

The fire failure temperature sensor 111 is disposed near the burners 41. If the fire failure temperature sensor 111 detects that the temperature of the burners 41 is not raised although gas is fed to the burners 41, the safety cutoff valve 107 is turned off to cut off the feeding of gas. In the case where the fire failure sensor 111 is actuated, an operator checks whether or not there occurs gas leakage while the safety cutoff valve 107 is left turned off. If it is judged that there occurs no gas leakage, the safety cutoff valve 107 is manually turned on to reset the burning control circuit 84.

A carrying passage 120 is provided on the lower portion of the inner surface of the case 44. When the rotating roasting kiln 40 is stopped with the opening 63 facing down and then the opening 63 is opened, the carrying passage 120 receives a roasted product which is dropped while being guided by the lids 42. The carrying passage 120 extending in the longitudinal direction of the roasting kiln 40 is provided, on both sides, with blasting apparatuses for blasting cooling wind or atmospheric air so as to cool the carrying passage 120.

The temperature of the roasted product 2, which has been heated in the roasting kiln 40 and discharged therefrom, is generally in a range of 150 to 200° C. If the roasted product 2 is kept in such a temperature range for several tens minutes, nutritious components such as vitamin and protein of the product begin to be altered. For this reason, to lower the temperature of the roasted product having been carried on the carrying passage 120 as fast as possible, the carrying passage 120 is disposed apart from the burners 41 for preventing the thermal effect due to thermal conduction, convection and radiation from the burners 41. To be more specific, the carrying passage 120 has side walls which is made as long as possible; it is cooled by cooling wind or atmospheric air; and it has a screw 121 for carrying out the roasted product 2 as fast as possible. With this arrangement, the temperature of the roasted product at the step of carrying out the product through the carrying passage 120 can be reduced to a value of 60 to 80° C.

The screw 121 is connected to an output shaft of an electric motor 122 provided outside the lower portion of the case 44. The screw 121 is adapted to carry the roasted product to a chute 124 connected to the carrying passage 120. The chute 124 is provided with another screw (not shown) which is adapted to take the roasted product having been carried in the chute 124.

Next, the operation of the roasting apparatus will be described.

In the initial state, the quantitative tank 1 is rendered empty; the opening at the bottom of the quantitative tank 1 is closed with the lid 18 operated by the motor-driven cylinder 33; and the bottom plates 9 in the quantitative tank 1 are kept in the horizontal state by contracting the cylinder rod of the motor-driven cylinder 13. The roasting kiln 40 is left stopped with the material charging opening 63 facing up; the opening 63 is closed with the lids 42; and the material charging port 93 of the case 44 is closed with the lid 94. The electric heaters 71 and the burners 41 in the roasting kiln 40 are not operated and the electric motor 122 is stopped.

The roasting works is then started. First, a raw material to be roasted, which is composed of water and grain, is stored in the quantitative tank 1 through the feed pipe 6. A quantitative sensor not shown (for example, load cell) detects the weight of the raw material and compares it with a target weight set in the program controller 130. If the weight of the raw material reaches the target weight, the feeding of the raw material from the feed pipe 6 is stopped. At this time, extra water is discharged from the water discharge pipe 7, and only the grain is stored in the net bag 8 stretched in the quantitative tank 1.

After the raw material is fed in the quantitative tank 1, the grain as the raw material begins to be dipped in water, and simultaneously the burners 41 are ignited on the basis of an ignition signal outputted from the program controller 130 to the burning control circuit 84 and the electric heaters 71 are operated to gradually heat the roasting kiln 40 on the basis of a heating signal outputted from the controller 130 to the electric heater control circuit 75'.

After the roasting kiln 40 begins to be heated, the lids 42 are opened by extending the cylinder rod of the motor-driven cylinder 58 on the basis of a signal outputted from the program controller 130 to the motor-driven cylinder 58, and the lid 94 is opened by contracting the cylinder rod of the motor-driven cylinder 98 on the basis of a signal outputted from the program controller 130 to the motor-driven cylinder 98. In this way, the roasting kiln 40 is ready for receiving the raw material.

The program controller 130 checks an elapse of time after it outputs the command for opening the lids 42 and 94 to the motor-driven cylinders 58 and 98. When the preparation for receiving the raw material on the roasting kiln side is completed after an elapse of a specific time (30 mins) required for dipping the raw material in water, the valve 36 is opened on the basis of a signal outputted from the program controller 130 to discharge water in the quantitative tank 1, and after the water in the quantitative tank 1 is discharged, the valve 36 is closed on the basis of a signal outputted from the program controller 130. Then, the lid 18 integrated with the bottom portion 34 is opened by contracting the cylinder rod of the motor-driven cylinder 33 to open the opening at the bottom of the quantitative tank 1, and the bottom plates 10 are opened by extending the cylinder rod 14 of the motor-driven cylinder 13. In such a state, the raw material in the net bag 8 is charged in the roasting kiln 40 via the opening at the bottom of the net bag 8, material charging port 93 and the opening 63.

After an elapse of a specific time since opening of the bottom plates 10, the bottom plates 10 are returned in the horizontal state to block the bottom of the net bag 8 by contracting the cylinder rod 14 of the motor-driven cylinder 13 on the basis of a signal outputted from the program controller 130, and also the lid 34 is closed by extending the cylinder rod of the motor-driven cylinder 33 on the basis of a signal outputted from the program controller 130, to block the opening at the bottom of the quantitative tank 1.

After the opening at the bottom of the quantitative tank 1 is closed, the electric motor 48 for rotating the roasting kiln 40 is operated on a signal outputted from the program controller 130. The rotational speed of the roasting kiln 40 is measured by a sound sensor (not shown) disposed near the roasting kiln 40. The sound sensor is adapted to detect a sound generated from the raw material moved in the roasting kiln 40. To be more specific, the sound sensor detects a sound periodically generated from the raw material when the raw material is moved in the roasting kiln 40 from the inner wall on the major axis side with a large curvature radius to the inner wall on the minor axis side with a small curvature radius, and outputs the detection result to the program controller 130.

Figure 18:
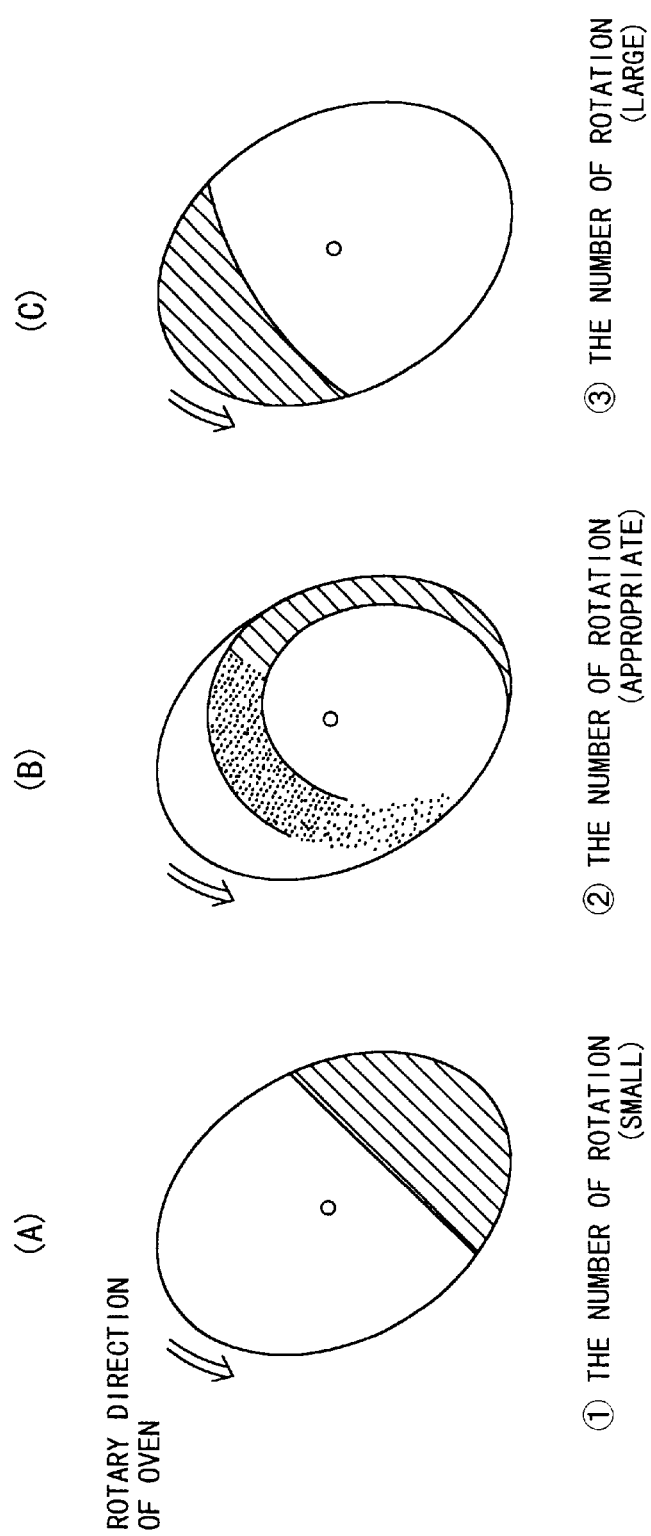
FIG. 18A is a view illustrating motion of grain in the roasting kiln upon low speed rotation.
FIG. 18B is a view illustrating motion of grain in the roasting kiln upon suitable rotation.
FIG. 18C is a view illustrating motion of grain in the roasting kiln upon high speed rotation in which the grain is accumulated on the bottom due to a centrifugal force.

Here, a behavior of the grain in the roasting kiln will be described. The behavior of the grain as the raw material to be roasted in the roasting kiln varies depending on a difference in rotational speed of the roasting kiln, as follows:

As shown in FIG. 18(A), in the case where the rotational speed of the roasting kiln is low, the grain present on the lower side of the major axis portion of the kiln 40 is moved upward along with rotation of the kiln 40, reaching the top of the kiln, and is moved downward along the inner wall of the kiln, to be thus agitated. That is to say, the grain is circulated while being slipped between the inner wall of the kiln and the upper supper of the grain, to be thus agitated. In this case, the contact time of the grain with the bottom of the kiln becomes longer, with a result that the grain tends to be partly heated and hence to be burnt. In other words, the grain is unevenly heated. The sound sensor detects the number of occurrence of sound "Zahhh" and outputs specified continuous signals.

As shown in FIG. 18B, in the case where the rotational speed of the roasting kiln 40 is suitable, the grain present at the lower side of the major axis portion of the kiln 40 is moved upward along with rotation of the kiln 40, and is thrown obliquely upward therefrom to be dropped along a parabolic locus. The grain thus dropped falls in the next coming major axis portion of the kiln 40, being continuously rotated, and is thrown again when it is moved upward. In this way, the grain is largely circulated to be agitated. As a result, the grain is not burnt and is suitably heated/roasted. The sound sensor detects the number of occurrence of sound "Za, Za, Za, . . . " and outputs specified discontinuous signals.

As shown in FIG. 18C, in the case where the rotational speed of the roasting kiln 40 is high, the grain present at the lower side of the major axis portion of the kiln 40 is moved upward with rotation of the kiln. In this case, since the centrifugal force applied to the grain becomes larger because of the high rotational speed of the kiln 40, the grain at the upper portion is not dropped and is usually rotated in contact with the major axis portion of the kiln 40. The sound sensor does not detect any sound of the grain.

In this embodiment, the rotational speed of the roasting kiln 40 is suitably controlled as shown in FIG. 18B. In addition, the present invention can be applied to the apparatus with no sound sensor. In this case, the rotational speed of the electric motor 48 for rotating the roasting kiln 40 may be generally controlled as follows: namely, letting N be the rotational speed of the electric motor 48 per unit time upon high rotation, the electric motor 48 is rotated at a rotational speed of ½※⁻N at the initial stage of roasting, ¾※⁻N at the medium stage of roasting, and N at the final stage of roasting. With this control of the rotational speed of the electric motor 48, the raw material to be roasted can be uniformly roasted in the roasting kiln 40.

During rotation of the roasting kiln 40, the temperature sensors 76, 77 and 78 shown in FIG. 11 output detected temperatures to the temperature measuring circuit 82 in the program controller 130, and the switching solenoid valve 106 for switching strong fire and weak fire of the burners 41 to each other is controlled by the determination circuit 83 and the burner control circuit 84 in the program controller 130 and also the electric heaters 71 are controlled by the electric heater control circuit 75'. That is to say, the heating energy can be calculated and set depending on the amount of the raw material to be roasted and the degree of roasting, so that the power fed to the electric heaters 71 and the increase/decrease in the burning energy of the burners 41 are controlled by comparing the detected results with the target temperature and target time, respectively.

In the case where the roasting apparatus is initially worked at the roasting work day, the heating time for heating the roasting kiln 40 is required. In this case, it is judged whether or not the present state is the initial work state or the continuous work state on the basis of the temperature detected by the in-kiln temperature sensor 110 connected to the program controller 130. If the present state is the initial work state, the roasting kiln 40 is preliminarily heated before the lids 42 of the roasting kiln 40 are opened. If the present state is the continuous work state, the feeding of the power to the electric heaters 71 is stopped for preventing an inconvenience that the raw material in the roasting kiln 40 is applied with excessive heat and is thereby unevenly roasted. Further, in the case where the roasting finish temperature of the raw material in the roasting kiln 40 is detected by the temperature sensor 76, it can be substantially detected during continuous rotation of the roasting kiln 40; however, to accurately detect the finish temperature, the electric motor 48 is once stopped and if the detected temperature does not reach the roasting finish temperature, the electric motor 48 is rotated again.

After the temperature of the raw material measured by the temperature sensor 76 reaches the target temperature, the electric motor 48 is rotated in such a manner that the opening 63 of the roasting kiln 40 faces directly downward. When the opening 63 of the roasting kiln 40 faces directly downward by the directly downward position detecting switch, the electric motor 48 is stopped. At the same time, the electric motor 122 is rotated, cooling wind is blasted to the interior and outer walls of the carrying passage 120 and to the inner and outer sides of the chute 124, and actuation of the electric heaters 71 and the burners 41 are stopped.

To determine an angle of rotation of the electric motor 48 at such a value that the opening 63 faces directly upward or downward, projections for detecting the directly upward position and the directly downward position are provided, for example, on the circumferential surface of the kiln opening/closing ring 57, and microswitches for detecting the directly upward position and the directly downward position are provided on the base 49.

Next, the lids 42 are opened by extending the cylinder rod of the motor-driven cylinder 58 to carry the raw material in the carrying passage 120, and then the raw material in the carrying passage 120 is carried in the chute 124 by rotating the electric motor 122 for a specific time and the lids 42 are closed by contracting the cylinder rod of the motor-driven cylinder 58. In this way, the roasting step is completed.

In addition, during a period in which the roasting operation is performed in the roasting kiln 40, a raw material in a specific amount is fed again from the feed pipe 6 in the quantitative tank 1 and stored therein, and the grain is dipped in water. In this way, the raw material is ready for roasting. Then, when the roasting step and discharging step are completed and the opening 63 of the roasting kiln 40 faces up, as described above, the lid 94 is opened by the contracting the cylinder rod of the motor-driven cylinder 98; the lid 34 is opened by contracting the cylinder rod of the motor-driven cylinder 33; and the bottom plates 10 are opened by extending the cylinder rod of the motor-driven cylinder 13. Thus, the new raw material is charged in the roasting kiln 40. After that, the lids 42 of the roasting kiln 40 are closed, the lids 94 and 34 are closed, and the bottom plates 10 are closed. Then, the roasting kiln 40 is rotated again, the burners 41 are ignited, and the electric heaters 71 are applied with a current. In this way, the next roasting works will be performed.

Next, a procedure for improving the gelatinization degree by providing the steam inlet pipe in the quantitative tank 1 will be described.

In the related art roasting method, before the roasting step, a raw material composed of water and grain having been charged in the quantitative tank 1 is dipped in water kept at a temperature of 10 to 20° C. for 30 minutes.

On the other hand, according to the roasting method using the quantitative tank 1 having the steam inlet pipe 1C, after a raw material composed of water and grain is charged in the quantitative tank 1, steam is fed in the quantitative tank 1 from the stem inlet pipe 1C to heat water used for dipping of the raw material at 35° C. and the raw material is dipped in the heated water for 15 minutes. The steam fed in the quantitative tank 1 is discharged from the steam outlet pipe 1D.

After the dipping of the raw material is completed, the valve 36 is opened to discharge the water, and steam kept at 160° C. is allowed to pass through the steam inlet pipe 1C to steam the grain for 15 minutes. The finishing temperature for the grain is set in a range of 90 to 100° C. The grain thus steamed is then roasted.

In the related art method, the water content of the raw material after dipping is about 20%; while in the present method, the water content of the raw material after steaming is about 26%. Also in the related art method, the gelatinization degree of the raw material is in a range of 30 to 40% after roasting for 30 minutes and is in a range of 50 to 60% after roasting for 30 minutes and pulverization. Meanwhile, in the present invention in which steam is fed in the quantitative tank 1, the gelatinization degree of the raw material is in a range of 50 to 60% after roasting and in a range of 70 to 80% after roasting and pulverization. Accordingly, a powder of the roasted and pulverized grain obtained according to the present invention can be used as a material for a health drink being good in digestion.

As described above, the roasting apparatus of the present invention is capable of automating a roasting process including steps of dipping a raw material to be roasted in water, carrying the raw material in a roasting kiln, and taking a roasted product out of the roasting kiln, thereby improving a working environment in roasting operation; and reducing the thermal effect of the roasting kiln at the steps other than the roasting step by performing a sequence of the steps for a short period of time, thereby uniformly roasting the raw material and controlling the roasting operation depending on the kind or state of the raw material.

While the preferred embodiment of the present invention has been described using specific terms, such description is for illustrative purposes only, and it is to be understood that changes and variations may be made without departing from the spirit or scope of the following claims.

What is claimed is:

1. A roasting apparatus comprising:
   a roasting kiln formed into a cylindrical shape having a non-circular cross section;
   a rotational shaft penetrating the center of said roasting kiln;
   an electric heater disposed at a portion, positioned in said roasting kiln, of said rotational shaft; and
   slip rings, disposed around said rotational shaft, for carrying a current to said electric heater.

2. A roasting apparatus comprising:
   a roasting kiln formed into a cylindrical shape having a non-circular cross section;
   an opening, provided in said roasting kiln, for carrying a raw material to be roasted in said roasting kiln and carrying a roasted product out of said roasting kiln;
   a kiln lid provided at an edge portion of said opening;
   a kiln lid opening/closing mechanism, provided on an outer side surface of said roasting kiln, for opening/closing said kiln lid while being supported by said rotational shaft;
   a carrying passage, provided under said roasting kiln, for receiving said roasted product from said opening of said roasting kiln when said opening faces down;
   heating means for heating said roasting kiln, said means being composed of at least either burners disposed on at least one of both the sides of said carrying passage or an electric heater disposed at a portion, positioned inside said roasting kiln, of said rotational shaft; and
   slip rings disposed around portions, positioned outside said roasting kiln, of said rotational shaft, said slip rings being adapted to carry a current to actuating means for actuating said kiln lid opening/closing mechanism and to carry a current to said electric heater.

3. A roasting apparatus according to claim 1 or 2, further comprising:
   a quantitative tank, disposed over a region where said kiln lid provided at the edge portion of said opening of said roasting kiln is rotated, for storing a raw material to be roasted in a specific amount;
   a carrying-out port, disposed in the bottom of said quantitative tank, for carrying out said raw material to be roasted;
   a tank lid disposed at an edge portion of said carrying-out port; and
   a tank lid opening/closing mechanism, disposed to said lid, for opening/closing said tank lid on the basis of an electric signal.

4. A roasting apparatus according to claim 3, further comprising:
   a steam inlet pipe and a steam outlet pipe disposed in said quantitative tank.

5. A roasting apparatus according to claim 1 or 2, wherein the outer surface of said electric heater disposed in said roasting kiln is covered with a metal pipe, and the surface of said metal pipe is coated with a far infrared radiation material.

6. A roasting apparatus according to claim 3, wherein a raw material to be roasted is processed by the steps of:
   feeding said raw material to be roasted in a specific amount in said quantitative tank;
   rotating said roasting kiln, stopping the rotation of said roasting kiln with said opening facing up, opening said kiln lid at said opening of said roasting kiln, and opening said tank lid at the bottom of said quantitative tank;
   charging said raw material to be roasted in of said quantitative tank into said roasting kiln, closing said tank lid at the bottom of said quantitative tank, and closing said kiln lid at said opening of said roasting kiln;
   starting the rotation of said roasting kiln and the heating by said burners and/or said electric heater;
   detecting the temperature of said raw material to be roasted in said roasting kiln, and stopping the heating by said electric heater and/or said burners after the measured temperature of said raw material to be roasted reaches a specific value, and simultaneously stopping the rotation of said roasting kiln in such a manner that said opening of said roasting kiln faces to said carrying passage;
   opening said lid at said opening of said roasting kiln after the rotation of said roasting kiln is stopped with said opening facing to said carrying passage; and
   carrying a roasted product in said roasting kiln into said carrying passage.

7. A roasting apparatus according to claim 1 or 2, further comprising:
   detecting means, disposed in said roasting kiln within a region in which said raw material to be roasted flows when said roasting kiln is rotated, for detecting the temperature of said raw material to be roasted; and
   slip rings for carrying a current to said detecting means, said slip rings being disposed around portions, positioned outside said roasting kiln, of said rotational shaft.

8. A roasting apparatus according to claim 1 or 2, wherein an electric motor for rotating said roasting kiln is connected to a program control mechanism for indicating a suitable rotational speed to said electric motor in such a manner that said raw material to be roasted is usually agitated along with control of the rotational speed of said rotational shaft of said roasting kiln and a change in water content.

9. A roasting apparatus according to claim 8, further comprising:
   a sound sensor, provided on measuring means for measuring the rotational speed of said roasting kiln, for detecting the number of occurrence of sound generated by said raw material to be roasted which is moved in said roasting kiln upon rotation of said roasting kiln.

* * * * *